United States Patent
Krishnamoorthy et al.

(10) Patent No.: US 11,546,415 B2
(45) Date of Patent: Jan. 3, 2023

(54) INTELLIGENT SERVER MIGRATION PLATFORM

(71) Applicant: Bank of America Corporation, Charlotte, NC (US)

(72) Inventors: Madhusudhanan Krishnamoorthy, Chennai (IN); Abhiraam Venkatesan, Chennai (IN); Ayesha Farha AmeerHamza, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 181 days.

(21) Appl. No.: 16/919,170

(22) Filed: Jul. 2, 2020

(65) Prior Publication Data

US 2022/0006853 A1   Jan. 6, 2022

(51) Int. Cl.
  *G06F 15/16*    (2006.01)
  *H04L 67/10*    (2022.01)
  *G06N 3/12*     (2006.01)
  *G06K 9/62*     (2022.01)
  *G06N 20/10*    (2019.01)

(52) U.S. Cl.
  CPC .............. *H04L 67/10* (2013.01); *G06K 9/623* (2013.01); *G06K 9/6218* (2013.01); *G06K 9/6262* (2013.01); *G06N 3/126* (2013.01); *G06N 20/10* (2019.01)

(58) Field of Classification Search
  CPC ....... H04L 67/10; G06K 9/6218; G06K 9/623
  See application file for complete search history.

(56) References Cited

U.S. PATENT DOCUMENTS

| | | | |
|---|---|---|---|
| 7,979,578 B2 | 7/2011 | Lakshmanan et al. | |
| 10,601,683 B1* | 3/2020 | Kulshreshtha | H04L 67/1002 |
| 2009/0192844 A1* | 7/2009 | Ramkumar | G06Q 10/06 705/7.15 |
| 2013/0006901 A1 | 1/2013 | Cantin | |
| 2015/0081911 A1 | 3/2015 | Li et al. | |
| 2016/0226789 A1* | 8/2016 | Sundararajan | G06F 9/5088 |
| 2019/0220319 A1* | 7/2019 | Parees | G06F 9/5027 |

\* cited by examiner

*Primary Examiner* — Hua Fan
(74) *Attorney, Agent, or Firm* — Weiss & Arons LLP

(57) ABSTRACT

Systems, methods and apparatus are provided for an intelligent server platform using genetic algorithms to execute a server migration based on fitness. The platform may locate hardware and software artifacts and map functional relationships between artifacts. Artifacts may be clustered based on interdependency to ensure that functionally related artifacts are migrated as a unit. The platform may apply a fitness protocol to generate a fitness score for each cluster and select clusters based on fitness score. The platform may apply a crossover protocol to optimize selected clusters for compliance with enterprise standards. The platform may iterate through the crossover protocol and modify a convergence goal based on populations of successive generations. The platform may rank artifacts and generate a protocol for migration. The platform may execute the migration in accordance with the migration protocol.

16 Claims, 3 Drawing Sheets

//  INTELLIGENT SERVER MIGRATION PLATFORM

FIELD OF TECHNOLOGY

Aspects of the disclosure relate to a platform for applying evolutionary computing and machine learning to execute a server migration.

BACKGROUND OF THE DISCLOSURE

Server migration is a complex process that requires understanding and consideration of usage levels, functional relationships, and business impact for a diverse set of server artifacts.

Conventionally, server migration involves a complete transfer of all artifacts from a source domain to a destination domain. However, complete migration might not result in an optimized server state due to obsolete or unutilized configurations of software or hardware in the source domain.

Evolutionary computing is a family of genetic algorithms for global optimization inspired by biological evolution. In evolutionary computing, an initial set of candidate solutions is generated and iteratively updated. Each new generation is produced by removing less desired solutions. In biological terminology, a population of solutions is subjected to selection and mutation. As a result, the population will gradually evolve to increase in fitness.

It would be desirable to apply genetic algorithms to the server migration process in order to eliminate obsolete and underperforming artifacts while preserving functional relationships and prioritizing business criticality.

SUMMARY OF THE DISCLOSURE

Systems, methods and apparatus for an intelligent server migration platform are provided. The platform may use machine-learning based genetic algorithms to execute an optimized migration of applications to a destination domain.

The platform may determine a first-generation population of hardware and software artifacts in the source domain. The platform may use a machine-learning algorithm to generate one or more clusters of functionally related artifacts from the first-generation population.

The platform may apply a fitness protocol to each cluster. The platform may use a fitness function to calculate a score for each cluster and quantify fitness for migration. The platform may select clusters with a fitness score at or above a predetermined threshold. The platform may define a convergence goal based on the fitness scores for the selected clusters.

The platform may apply a crossover protocol to the selected clusters. The platform may validate each selected cluster against enterprise standards. The platform may iterate through the crossover protocol to validate remaining selected clusters. The platform may modify the convergence goal based on the crossed over clusters.

The platform may prioritize crossed over clusters based on fitness for migration. The platform may rank hardware and software artifacts based on priority. The platform may execute the migration in accordance with the ranking.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
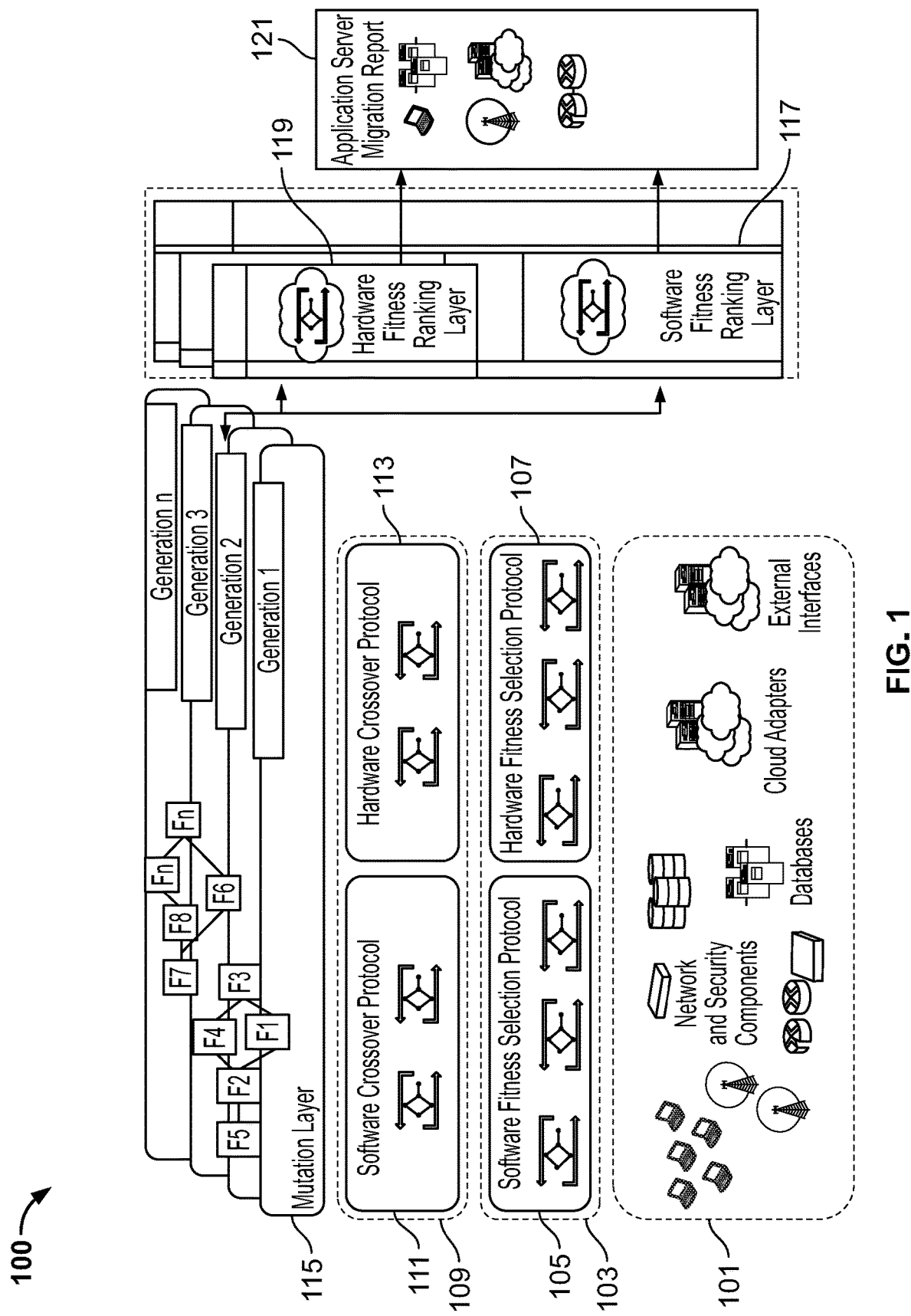
FIG. 1 shows illustrative architecture in accordance with principles of the disclosure.

Systems, methods and apparatus for an intelligent server migration platform are provided. The platform may use genetic algorithms to prioritize artifacts from a source domain based on fitness and execute a migration to a destination domain.

The platform may include a population layer. The population layer may generate an inventory of hardware and software artifacts in the source domain. The hardware and software artifacts in the source domain may form a first-generation population. The population layer may identify functional relationships between artifacts. The population layer may generate clusters based on functional relationships between the artifacts.

The platform may access hardware and software information from the source domain to identify the first-generation artifacts. The platform may access source domain data related to connected databases, graphics processing units (GPUs), middleware, or any other relevant software or hardware.

The platform may access telemetric sensors or other embedded devices to determine hardware data. Telemetric sensors remotely measure data and may be installed in hardware artifacts. The telemetric sensors may be wireless or hard-wired. The telemetric sensors may be Internet of Things (IOT) sensors.

The platform may access software metadata and technical logs to determine software data. Technical logs, such as an event log, record interactions between source domain artifacts. Software telemetry may gather data on the use and performance of applications and application components. Illustrative data includes how often specific features are used, measurements of start-up time and processing time, application crashes, general usage statistics and user behavior. Software telemetry may be used to gather detailed data such as individual window metrics, counts of used features, and individual function timings.

The platform may use specialized software for searching, monitoring and examining data, such as the Splunk® software manufactured by Splunk, Inc. of San Francisco, Calif. Splunk software may capture, index, and correlate real-time data in a searchable container from which it can produce graphs, reports, and alerts.

In some embodiments, functional relationships between artifacts may be determined through a linkage analysis of software components. For example, a calling chain may identify relationships between subroutines in a computer program. The platform may use a call graph generator or any other suitable method to identify a call chain.

In some embodiments, functional relationships may be determined through database updates which require concomitant updates to dependent artifacts. In some embodiments, functional relationships may be determined through technical logs recording interactions between source domain artifacts. For example, an event log may be used to understand system activity, particularly in the case of server applications with little or no user interaction. In some embodiments, the platform may combine log file entries from multiple sources to correlate seemingly unrelated events involving different artifacts. In some embodiments, functional relationships may also be determined through network-wide querying and reporting.

The population layer may operate using one or more unsupervised algorithms. In some embodiments, the population layer may be semi-supervised. For example, a user may provide an architecture diagram to guide the system in identifying interdependency among artifacts.

The population layer may generate clusters of interdependent artifacts based on the functional relationship data. The clustering may ensure that interdependent components are migrated together. The clustering may ensure that migration fitness is determined for a group of interdependent artifacts as a unit. The clustering may enable a group of interdependent artifacts with a significant business impact to be prioritized as a unit.

A cluster may include artifacts that are functionally related. A cluster may include a combination of hardware and software components. The platform may include one or more unsupervised clustering algorithms. Illustrative clustering algorithms include connectivity-based hierarchical clustering, centroid-based clustering (such as k-means clustering), distribution-based clustering, and density-based clustering.

The platform may include a fitness layer. The fitness layer may determine eligibility of each cluster for migration using a fitness function. The fitness layer may separately analyze the hardware and software artifacts in a cluster. The fitness layer may ensure that only active components are candidates for migration. The fitness layer may ensure that criticality of components is taken into account.

The fitness layer may include a fitness function. A fitness function is an objective function which takes a candidate solution as input and produces output regarding the strength of the solution. The fitness function summarizes how close a given design solution is to achieving a goal. Fitness functions in evolutionary computing guide the process toward optimal design solutions.

The fitness function may be a rule-based protocol. The fitness function may act as metadata for each artifact present in a cluster. The fitness function may include a first set of metrics for hardware and a second set of metrics for software.

The metrics included in the fitness function may be determined from recent logs, MQTT transactions, customer severity analysis, application metadata, dependencies between artifacts, or from any other suitable source. The metrics may access data used in the population layer. The metrics may represent activity level and business criticality for the cluster artifacts.

Illustrative metrics included in the fitness function for a software artifact may include activeness, user base, recent coding changes, impact to business (on a scale of 1-10), and dependency with another critical enterprise unit (on a scale of 1-10). Each metric may be weighted. The platform may adjust the weighting to reflect enterprise priorities, migration plans, parameters of the destination server, or for any other reason. The fitness function may produce a fitness score. A fitness score for a cluster may be calculated based on a sum of the weighted metrics.

In some embodiments, software artifacts may be analyzed based on application characteristics. Illustrative application characteristics include criticality, impact, frequency of coding changes, and percentage of active code in a program. Hardware components such as databases may analyzed based on characteristics such as memory size or shareability of data.

Equation 1 shows an illustrative fitness function for a software artifact, where x, y, z, a and b are weights for the different metrics:

$$\text{Fitness score} = (x^*\text{activeness}) + (y^*\text{user base}) + (z^*\text{recent coding changes}) + (a^*\text{business impact}) + (b^*\text{dependency with a critical enterprise unit}). \quad \text{Equation 1}$$

The fitness layer may define a convergence goal. The convergence goal may correspond to overall system readiness for migration. The convergence goal may be based on a sum of the weighted scores for all the clusters.

Clusters with a fitness score below a predetermined threshold may be placed in a fitness exception queue. The fitness exception queue may include a manual override. Clusters with a fitness score at or above a predetermined threshold may be selected for a crossover protocol.

The platform may include a crossover layer. The crossover layer may include a crossover protocol. The crossover protocol may optimize hardware and software artifacts for compliance with entity standards.

At a crossover point, the platform may evaluate selected clusters. The selected clusters may have a fitness score that exceeds a predetermined threshold. The clusters may be selected based on their fitness scores. The platform may receive enterprise software and hardware standards. The platform may apply a crossover protocol to validate the cluster metadata against the hardware and software standards. The platform may separately analyze the hardware and software artifacts.

A cluster that does not satisfy entity standards may be placed in a crossover exception queue for manual optimization. A cluster that satisfies hardware and software standards may be crossed over to a next generation. The optimized cluster may be offspring of the first generation. The crossed over clusters may form a second-generation population.

The crossover protocol may iterate to account for clusters transferred back into the population from the exception queue. Clusters may be transferred in response to updates or patches, in response to changes in enterprise standards, or for any other reason. Each iteration through the crossover protocol may generate a successive generation with a new population.

The platform may include a mutation layer. The mutation layer may modify the convergence goal to adjust the score needed to begin migration. The mutation layer may iterate through the crossover layer to monitor the evolving optimization and adjust the convergence goal accordingly. The updated convergence goal may reflect the composition of successive generations of artifact clusters. The mutation layer may evaluate a probability threshold for the migration.

The mutation layer may update the priority for clusters based on fitness scores. The mutation layer may update each individual software and hardware component and for each cluster. The mutation layer may transmit the priority information to a ranking layer.

The platform may include a ranking layer. The ranking layer may prioritize the clusters and segregate them in the form of software and hardware components. The ranking layer may communicate with the mutation layer to capture rankings from successive generations. The ranking layer may ensure that applications with high business criticality are prioritized for migration. The ranking layer may include a residual queue that lists all excluded software and hardware components. The ranking layer may generate an application migration report including a plan for prioritized execution of the migration.

In response to achieving the convergence goal, the platform may execute the migration in accordance with the priority established in the ranking layer and the application migration report. In some embodiments, artifacts with a priority above a predetermined threshold may be migrated before the convergence goal is reached.

The platform may incorporate any suitable supervised or semi-supervised machine learning algorithms. The learning algorithm may be a support vector machine. The support vector machine may be configured for linear or non-linear classification, regression analysis or any suitable algorithm. The support vector machine may use a training algorithm to build models for classification.

The platform may include various hardware components. Such components may include a battery, a speaker, and antenna(s). The platform may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. Software may provide instructions, that when executed by the microprocessor, enable the platform to perform various functions. For example, software may include an operating system, application programs, web browser and a database. Alternatively, some or all of computer executable instructions of the platform may be embodied in hardware or firmware components of the platform.

Application programs, which may be used by the platform, may include computer-executable instructions for invoking user functionality related to communication, authentication services, and voice input and speech recognition applications. Application programs may utilize one or more algorithms that encrypt information, process received executable instructions, interact with enterprise systems, perform power management routines or other suitable tasks.

The platform may operate in a networked environment. The platform may support establishing communication channels with one or more enterprise systems. The platform may connect to a local area network ("LAN"), a wide area network ("WAN") a cellular network or any suitable communication network. When used in a LAN networking environment, the platform may be connected to the LAN through a network interface or adapter. When used in a WAN networking environment, the platform may include a modem or other means for establishing communications over a WAN, such as the Internet. It will be appreciated that the existence of any of various well-known protocols such as TCP/IP, Ethernet, FTP, HTTP and the like is presumed.

The platform may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The platform may utilize computer-executable instructions, such as program modules, being executed by a computer. Generally, program modules include routines, programs, objects, components, data structures, etc. that perform particular tasks or implement particular abstract data types. The platform may be operational with distributed computing environments where tasks are performed by remote processing devices that are linked through a communications network. In a distributed computing environment, program modules may be located in both local and remote computer storage media including memory storage devices.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative platform architecture 100. Population layer 101 includes hardware and software artifacts from the source domain. Illustrative artifacts shown in population layer 101 include network and security components, databases, cloud adapters and external interfaces. Semi-supervised and unsupervised algorithms may access telemetry sensors, technical logs, software metadata and any other suitable data source to locate artifacts and map functional relationships between artifacts. Clustering algorithms may group interdependent artifacts into clusters. The clusters may form a first-generation population.

Fitness layer 103 generates a composite fitness score quantifying activeness and business impact for each cluster in the first generation.

Fitness layer 103 includes software fitness selection protocol 105. Software fitness selection protocol 105 may include a software fitness function. The software fitness function may include weighted metrics for software artifacts from each cluster. Fitness layer 103 may include hardware fitness selection protocol 107. Hardware fitness selection protocol 107 may include a hardware fitness function. The hardware fitness function may include weighted metrics for hardware artifacts from each cluster.

Clusters with a fitness score above a predetermined threshold may be selected for a crossover protocol. Clusters with a fitness score below the predetermined threshold may be transferred to a fitness exception queue.

Crossover layer 109 includes software crossover protocol 111. Software crossover protocol 111 may validate software artifacts in the selected clusters against enterprise standards. Crossover layer 109 may include hardware crossover protocol 113. Hardware crossover protocol 113 may validate hardware artifacts in the selected clusters against enterprise standards.

Clusters that are optimized for enterprise standards may be crossed over to a next generation. Clusters with artifacts that are not optimized may be transferred to a crossover exception queue for mitigation.

Mutation layer 115 may modify a convergence goal based on crossed over clusters. Mutation layer 115 may be a looping layer over the crossover protocol. Selected clusters may move from an exception queue through the crossover protocol. Mutation layer 115 may modify the convergence goal based on the new populations of successive generations 1-n. Mutation layer 115 may prioritize clusters for migration.

Software fitness ranking layer 117 may rank software for migration according to the priority generated by mutation layer 115. Software fitness ranking layer 117 may communicate with mutation layer for updated priority data. Hardware fitness ranking layer 119 may rank hardware for migration according to the priority established in mutation layer 115. Hardware fitness ranking layer 119 may communicate with mutation layer 115 for updated priority data.

The platform generates application server migration report 121. Application server migration report 121 may include a comprehensive list of artifacts for migration. Application server migration report 121 may include a comprehensive migration plan. Application server migration report 121 may include a timeline for migration of the artifacts.

Figure 2:
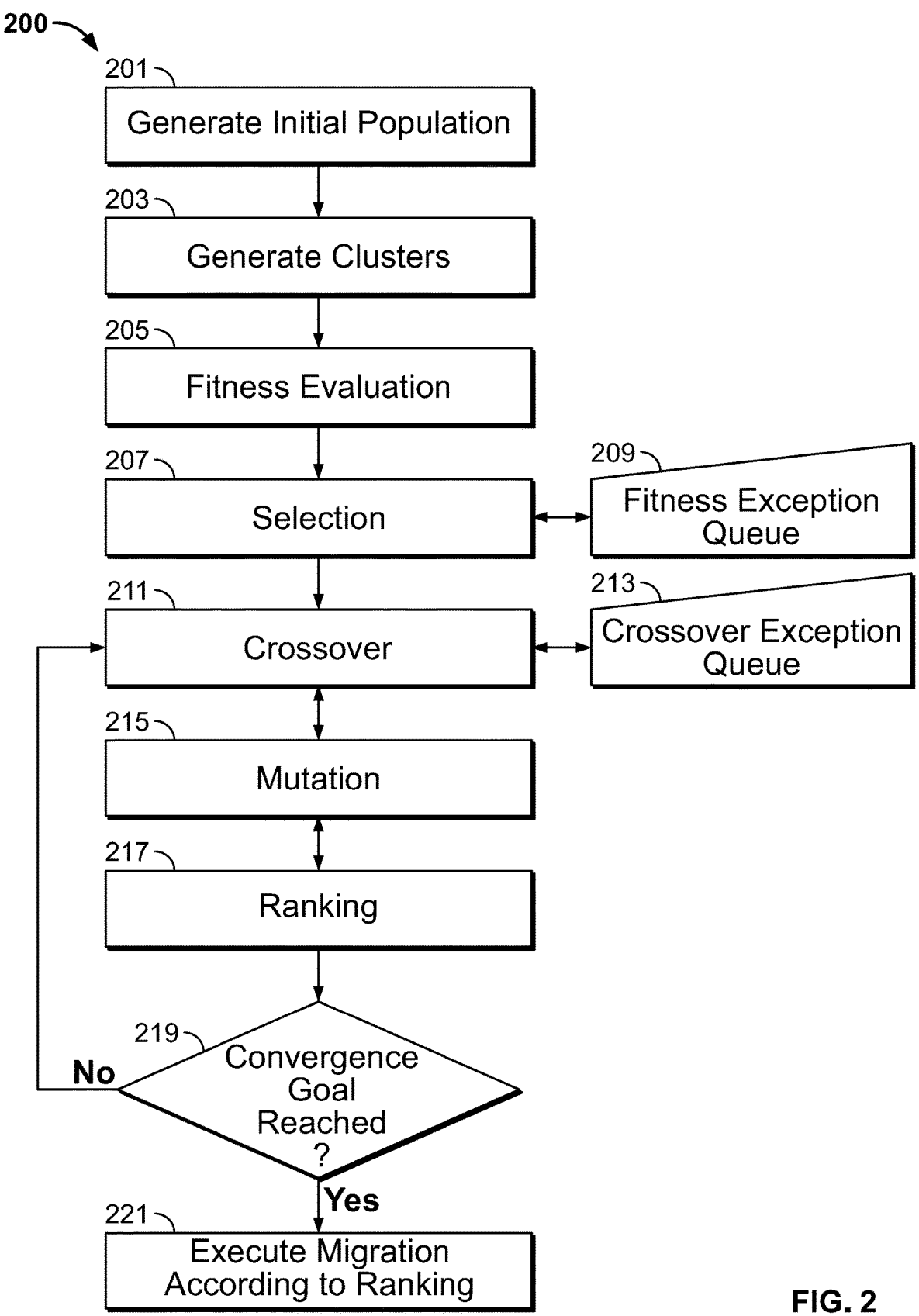
FIG. 2 shows an illustrative process flow in accordance with principles of the disclosure.

FIG. 2 shows illustrative process 200 for executing a server migration using unsupervised or semi-supervised genetic algorithms. At step 201, the platform generates an initial population. Semi-supervised and unsupervised algorithms may access telemetry sensors, technical logs, software metadata and any other suitable data to locate artifacts and map functional relationships between artifacts. At step 203 the platform generates clusters based on interdependencies between the artifacts.

At step 205, the platform evaluates the fitness of each cluster for migration. The platform may use a fitness function to calculate a score for each cluster that reflects activeness and business criticality. At step 207, clusters with a fitness score at or above a predetermined threshold may be selected for crossover. At step 209, clusters with a fitness score below the threshold are transferred to a fitness exception queue. Clusters may be transferred back into the selected group in response to manual override or adjustment to the threshold.

At step 211, selected clusters are crossed over in response to validation against enterprise standards. At step 213, clusters that are not optimized for enterprise standards are transferred to a crossover exception queue. Clusters transferred from the exception queue may be validated under the crossover protocol.

At step 215, the platform mutation layer modifies the convergence goal based on the evolving population of clusters that have been crossed over. The mutation layer may prioritize the crossed over clusters based on fitness.

At step 217, the platform ranks artifacts from each cluster to generate a prioritized migration protocol. At step 219 the platform determines whether the convergence goal has been reached, indicating readiness for migration. If the convergence goal has not been reached, the platform may return to step 211 and iterate through the crossover protocol. Adjustments to enterprise standards or manual optimization may allow clusters from the exception queue to be reevaluated for crossover. At step 221, the convergence goal has been reached and the platform executes the migration, migrating artifacts from the source domain according to the ranking.

Figure 3:
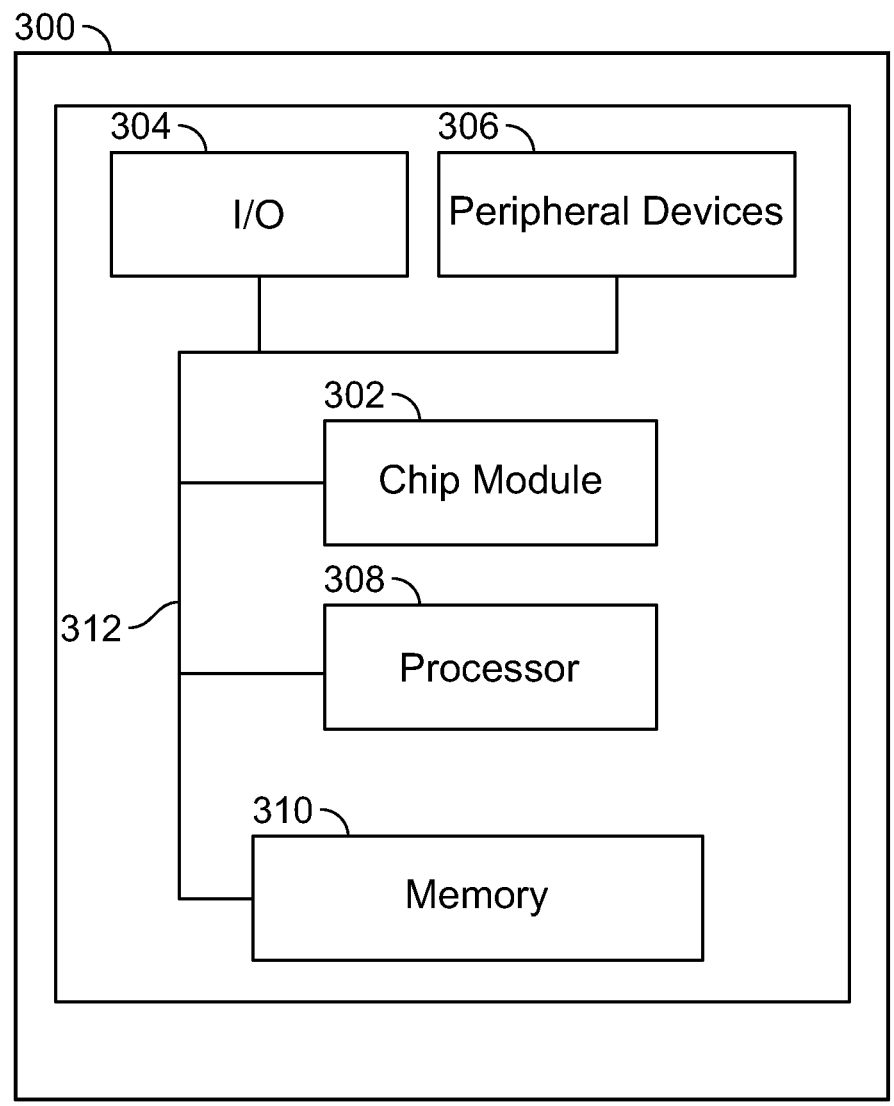
FIG. 3 shows an illustrative apparatus in accordance with principles of the disclosure.

FIG. 3 shows illustrative apparatus 300 that may be configured in accordance with the principles of the disclosure. Apparatus 300 may be a computing machine. Apparatus 300 may include chip module 302, which may include one or more integrated circuits, and which may include logic configured to perform any suitable logical operations.

Apparatus 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable media or devices; peripheral devices 306, which may include counter timers, real-time timers, power-on reset generators or any other suitable peripheral devices; logical processing device 308, which may compute data structural information and structural parameters of the data; and machine-readable memory 310.

Machine-readable memory 310 may be configured to store in machine-readable data structures: machine executable instructions or computer code, applications, signals, and/or any other suitable information or data structures.

Components 302, 304, 306, 308 and 310 may be coupled together by a system bus or other interconnections 312 and may be present on one or more circuit boards such as 320. In some embodiments, the components may be integrated into a single chip. The chip may be silicon-based.

Thus, methods and apparatus for an INTELLIGENT SERVER MIGRATION PLATFORM are provided. Persons skilled in the art will appreciate that the present invention can be practiced by other than the described embodiments, which are presented for purposes of illustration rather than of limitation, and that the present invention is limited only by the claims that follow.

What is claimed is:

1. An intelligent server migration platform comprising computer hardware and using genetic algorithms to execute an optimized migration of applications to a destination domain, the platform comprising:
   a population layer configured to:
      identify a first-generation population of hardware and software artifacts in the source domain; and
      using a machine-learning algorithm, generate one or more clusters from the first-generation population, each cluster comprising a set of functionally related hardware and software artifacts;
   a fitness layer configured to:
      apply a fitness function to the hardware and software artifacts in each cluster to generate a fitness score for the cluster, the fitness function comprising a first set of metrics for each hardware artifact in the cluster and a second set of metrics for each software artifact in the cluster;
      select clusters having a fitness score above a predetermined threshold; and
      generate a convergence goal for the migration based at least in part on the fitness scores of the selected clusters;
   a crossover layer configured to:

validate each hardware and software artifact in a selected cluster against an enterprise standard; and
in response to validation of the software and hardware artifacts, cross over the selected cluster to a second-generation population;
a mutation layer configured to modify the convergence goal for the migration in response to crossover of a selected cluster; and
a ranking layer configured to prioritize hardware and software artifacts from each crossed over cluster to generate a first ranked list comprising hardware artifacts and a second ranked list comprising software artifacts;
wherein:
the platform is configured to execute the migration of the hardware artifacts in the order of the first ranked list and migration of the software artifacts in order of the second ranked list; and
the fitness function comprises metrics for activeness, user base, recent coding changes, business impact, and dependency with a critical enterprise unit.

2. The platform of claim 1, wherein the population layer is further configured to:
based on data from at least one of a telemetric sensor and a technical log, identify a functional relationship between a hardware artifact and a software artifact; and
generate a cluster comprising the hardware artifact and the software artifact based at least in part on the functional relationship.

3. The platform of claim 1, wherein the metrics are weighted based on a destination server parameter.

4. The platform of claim 1, wherein the convergence goal is equal to a sum of weighted fitness scores for the selected clusters.

5. The platform of claim 1, wherein the crossover layer is further configured to transfer a cluster that does not meet the enterprise standard to a crossover exception queue for mitigation.

6. The platform of claim 1, wherein the platform is further configured to execute the migration in response to a population fitness reaching the convergence goal.

7. One or more non-transitory computer-readable media storing computer-executable instructions which, when executed by a processor on a computer system, perform a method for executing an optimized migration of applications from a source domain to a destination domain, the method comprising:
identifying a first-generation population of hardware and software artifacts in the source domain;
using a machine-learning algorithm, generating one or more clusters, each cluster comprising functionally related hardware and software artifacts from the first-generation population;
applying a fitness function to the artifacts in each cluster to generate a fitness score for the cluster, the fitness function comprising a first set of metrics for each hardware artifact in the cluster and a second set of metrics for each software artifact in the cluster;
selecting clusters having a fitness score above a predetermined threshold score;
generating a convergence goal for the migration based at least in part on the fitness scores for the selected clusters;
applying a crossover protocol to the selected clusters, the crossover protocol comprising:
validating each artifact in the selected cluster against an enterprise standard;
crossing over the selected cluster to a next-generation population; and
iterating through the crossover protocol to validate any remaining selected clusters;
modifying the convergence goal for the migration based on crossover of the selected cluster;
prioritizing artifacts from each crossed over cluster to generate a ranked list of hardware artifacts and a ranked list of software artifacts; and
executing the migration in the order of the ranked list of hardware artifacts and the ranked list of software artifacts;
wherein the fitness function comprises metrics for activeness, user base, recent coding changes, business impact, and dependency with a critical enterprise unit.

8. The media of claim 7, wherein the fitness function metrics are weighted based on a destination server parameter.

9. The media of claim 7, wherein the convergence goal is equal to a sum of weighted fitness scores for the selected clusters.

10. The media of claim 7, wherein the crossover layer is further configured to transfer a cluster that does not meet the enterprise standard to a crossover exception queue for mitigation.

11. The media of claim 7, wherein the platform is further configured to execute the migration in response to a population fitness reaching the convergence goal.

12. A system for intelligent server migration using genetic algorithms to optimize migration of applications, the system comprising:
a source domain server comprising a plurality of first-generation hardware and software artifacts;
a destination domain server;
a processor comprising a server migration platform configured to:
access source domain artifact data and metadata, the data comprising telemetric sensor data;
using a machine-learning algorithm, generate one or more clusters, each cluster comprising interdependent source domain hardware and software artifacts;
apply a weighted fitness function to the hardware and software artifacts in each cluster to generate a fitness score for each cluster, the fitness function comprising metrics for activeness, user base, recent coding changes, business impact, and dependency with a critical enterprise unit;
select clusters having a fitness score above a predetermined threshold;
define a convergence goal for the migration based at least in part on the fitness scores for the selected clusters;
validate each artifact in the selected clusters against an enterprise standard;
when the artifacts in a selected cluster meet the enterprise standard, cross over the cluster to a second generation;
when the artifacts in a selected cluster do not meet the enterprise standard, transfer the cluster to a crossover exception queue for mitigation;
modify the convergence goal for the migration based on the crossed over cluster;
prioritize artifacts in each crossed over cluster to generate a ranked list of hardware artifacts and a ranked list of software artifacts; and execute the migration in accordance with the ranked list of hardware artifacts and the ranked list of software artifacts.

13. The system of claim 12, wherein the platform is further configured to identify a functional relationship between source domain artifacts.

14. The system of claim 12, wherein the platform is further configured to generate a residual queue comprising hardware and software artifacts from the source domain that do not qualify for migration to the destination domain.

15. The platform of claim 12, wherein a metric associated with the fitness function is weighted based on a destination server parameter.

16. The platform of claim 12, wherein the convergence goal is equal to a sum of weighted fitness scores for the selected clusters.

\* \* \* \* \*